United States Patent
Narasimhan

(10) Patent No.: US 8,516,450 B2
(45) Date of Patent: Aug. 20, 2013

(54) DETECTING REAL-TIME INVALID MEMORY REFERENCES

(75) Inventor: Balasubramanian Narasimhan, Santa Clara, CA (US)

(73) Assignee: Oracle International Corporation, Redwood Shores, CA (US)

(*) Notice: Subject to any disclaimer, the term of this patent is extended or adjusted under 35 U.S.C. 154(b) by 394 days.

(21) Appl. No.: 12/727,803

(22) Filed: Mar. 19, 2010
(Under 37 CFR 1.47)

(65) Prior Publication Data
US 2011/0231826 A1   Sep. 22, 2011

(51) Int. Cl.
*G06F 9/44* (2006.01)

(52) U.S. Cl.
USPC .......................................................... 717/128

(58) Field of Classification Search
None
See application file for complete search history.

(56) References Cited

U.S. PATENT DOCUMENTS

| | | | |
|---|---|---|---|
| 56,200 A | 7/1866 | Li et al. | |
| 135,789 A | 2/1873 | Dewitt, Jr. et al. | |
| 5,367,670 A | 11/1994 | Ward et al. | |
| 5,613,063 A * | 3/1997 | Eustace et al. | 714/38.1 |
| 5,644,709 A * | 7/1997 | Austin | 714/53 |
| 6,002,872 A | 12/1999 | Alexander et al. | |
| 6,158,024 A * | 12/2000 | Mandal | 714/37 |
| 6,633,975 B1 | 10/2003 | Sawada et al. | |
| 6,634,020 B1 | 10/2003 | Bates et al. | |
| 6,748,558 B1 | 6/2004 | Gonzales et al. | |
| 7,058,928 B2 | 6/2006 | Wygodny et al. | |
| 7,299,487 B1 * | 11/2007 | Campbell et al. | 725/93 |
| 7,343,460 B2 | 3/2008 | Poston | |
| 7,409,517 B2 | 8/2008 | Dageville et al. | |
| 7,499,960 B2 | 3/2009 | Dageville et al. | |
| 7,669,189 B1 | 2/2010 | Umamageswaran | |
| 7,882,307 B1 * | 2/2011 | Wentzlaff et al. | 711/119 |
| 2002/0023203 A1 * | 2/2002 | Cofler et al. | 712/227 |
| 2002/0066079 A1 | 5/2002 | Ionescu | |
| 2003/0056200 A1 * | 3/2003 | Li et al. | 717/128 |
| 2003/0079097 A1 * | 4/2003 | Wei et al. | 711/162 |
| 2003/0120980 A1 * | 6/2003 | Harris | 714/45 |
| 2003/0135789 A1 | 7/2003 | DeWitt et al. | |
| 2003/0191867 A1 * | 10/2003 | Czajkowski | 709/315 |
| 2004/0019774 A1 * | 1/2004 | Fuchikami et al. | 712/244 |
| 2005/0091373 A1 | 4/2005 | Ciapala et al. | |
| 2005/0114621 A1 | 5/2005 | Lahiri et al. | |
| 2005/0193376 A1 | 9/2005 | Harrison | |
| 2006/0143350 A1 * | 6/2006 | Miloushev et al. | 710/242 |
| 2007/0094473 A1 * | 4/2007 | Dryfoos et al. | 711/170 |
| 2007/0157200 A1 * | 7/2007 | Hopkins | 718/100 |
| 2007/0186044 A1 * | 8/2007 | Fowles | 711/130 |
| 2008/0005438 A1 * | 1/2008 | Xing et al. | 710/241 |
| 2008/0141005 A1 * | 6/2008 | Dewitt et al. | 712/220 |
| 2008/0155246 A1 * | 6/2008 | Jennings et al. | 713/2 |
| 2008/0201393 A1 * | 8/2008 | Krauss | 707/206 |

(Continued)

OTHER PUBLICATIONS

U.S. Appl. No. 10/184,379, pp. 38.

(Continued)

*Primary Examiner* — Wei Zhen
*Assistant Examiner* — Adam R Banes
(74) *Attorney, Agent, or Firm* — Silicon Valley Patent Group LLP; Omkar Suryadevara

(57) ABSTRACT

A method, system, and computer program product for identifying invalid memory references. In one embodiment, invalid memory references are identified as they occur. In another embodiment, the invalid memory references are identified within a customized operating system that runs within an application.

30 Claims, 7 Drawing Sheets

(56) References Cited

U.S. PATENT DOCUMENTS

| | | | |
|---|---|---|---|
| 2008/0215305 A1* | 9/2008 | Bishop et al. | 703/15 |
| 2008/0235481 A1 | 9/2008 | Baddepudi et al. | |
| 2008/0244239 A1* | 10/2008 | DeWitt et al. | 712/220 |
| 2008/0288809 A1* | 11/2008 | Koguchi et al. | 714/2 |
| 2010/0191923 A1* | 7/2010 | Archer et al. | 711/154 |
| 2011/0022817 A1* | 1/2011 | Gaster et al. | 711/202 |
| 2011/0138368 A1* | 6/2011 | Krauss | 717/133 |

OTHER PUBLICATIONS

U.S. Appl. No. 12/543,806, pp. 27.

Carzaniga et al. Design and Evaluation of a Wide-area Event Notification Service, Aug. 2001, ACM TOCS, vol. 19, Issue 3, pp. 332-383.

Begole et al. "Flexible Collaboration Transparency: Supporting Wroker Independence in Replicated Application-sharing Systems", Jun. 1999, ACM, TOCHI, vol. 6, Issue 2, pp. 95-132.

Bugnion et al. Disco: Running commodity Operating Systems on Scalable Multiprocessors, Nov. 1997, ACM, TOCS, vol. 15, Issue 4, pp. 412-447.

Office Action dated Aug. 12, 2005 in U.S. Appl. No. 10/184,379, USPTO.

Amendment dated Nov. 7, 2005 in U.S. Appl. No. 10/184,379, USPTO.

Final Office Action dated Feb. 14, 2006 in U.S. Appl. No. 10/184,379, USPTO.

Amendment after Final dated Apr. 6, 2006 in U.S. Appl. No. 10/184,379, USPTO.

Amendment after Final, initialed by the Examiner, dated Apr. 20, 2006 in U.S. Appl. No. 10/184,379, USPTO.

Advisory Action dated May 4, 2006 in U.S. Appl. No. 10/184,379, USPTO.

Supplemental Advisory Action dated Jun. 19, 2006 in U.S. Appl. No. 10/184,379, USPTO.

Appeal Brief dated Oct. 11, 2006 in U.S. Appl. No. 10/184,379, USPTO.

Examiner's Answer to Appeal Brief dated Dec. 7, 2006 in U.S. Appl. No. 10/184,379, USPTO.

Reply Brief dated Feb. 7, 2007 in U.S. Appl. No. 10/184,379, USPTO.

BPAI Decision dated Jul. 16, 2007 in U.S. Appl. No. 10/184,379, USPTO.

Amendment dated Aug. 30, 2007 in U.S. Appl. No. 10/184,379, USPTO.

Office Action dated Nov. 1, 2007 in U.S. Appl. No. 10/184,379, USPTO.

Amendment dated May 2, 2008 in U.S. Appl. No. 10/184,379, USPTO.

Final Office Action dated Jul. 22, 2008 in U.S. Appl. No. 10/184,379, USPTO.

Amendment after Final Oct. 23, 2008 in U.S. Appl. No. 10/184,379, USPTO.

Advisory Action dated Dec. 18, 2008 in U.S. Appl. No. 10/184,379, USPTO.

Pre-Brief Conference Request and Notice of Appeal dated Jan. 22, 2009 in U.S. Appl. No. 10/184,379, USPTO.

Pre-Brief Appeal Conference Decision dated Feb. 6, 2009 in U.S. Appl. No. 10/184,379, USPTO.

Amendment dated May 27, 2009 in U.S. Appl. No. 10/184,379, USPTO.

Notice of Allowance dated Jul. 21, 2009 in U.S. Appl. No. 10/184,379, USPTO.

Amendment after Notice of Allowance dated Jul. 24, 2009 in U.S. Appl. No. 10/184,379, USPTO.

Response to Amendment under Rule 312 dated Jul. 31, 2009 in U.S. Appl. No. 10/184,379, USPTO.

Office Action dated Feb. 11, 2011 in U.S. Appl. No. 12/543,806, USPTO.

Terminal Disclaimer dated Jun. 13, 2011 in U.S. Appl. No. 12/543,806, USPTO.

Amendment dated Jun. 13, 2011 in U.S. Appl. No. 12/543,806, USPTO.

Examiner's Interview Summary dated Jun. 14, 2011 in U.S. Appl. No. 12/543,806, USPTO.

Terminal Disclaimer Review Decision dated Jun. 27, 2011 in U.S. Appl. No. 12/543,806, USPTO.

Notice of Allowance dated Jun. 30, 2011 in U.S. Appl. No. 12/543,806, USPTO.

* cited by examiner

DETECTING REAL-TIME INVALID MEMORY REFERENCES

BACKGROUND OF THE INVENTION

This invention generally relates to software, and more specifically, to detecting invalid memory references as they occur, during the software development process.

During software development, an application is tested under a variety of conditions to discover latent errors, sometimes referred to as bugs. Current debugging techniques involve logging errors that occur during execution, such as invalid memory references. Consequentially, the application is modified to remove the bugs and provide a more stable product for release.

One problem with current debugging techniques is that diagnosing the errors can take a lot of time and effort due to lack of information. For example, an invalid memory reference needs to be consistently reproduced in order to make the appropriate modifications. However, when the application continues processing, the error can be overwritten or otherwise lost. As a result, the software development time is increased and/or the stability of the application is decreased.

Furthermore, some traditional debugging techniques that determine errors from the perspective of an application running over an operating system fail to provide sufficient granularity for more complex environments. In particular, integrated database applications include an customized operating system environment that runs within the software. By viewing errors from the perspective of a general operating system, traditional debugging techniques may not provide enough detail about the error for modification.

As can be appreciated, it is desirable for a software developer to be able to effectively and efficiently debug software for invalid memory references in a proactive manner. Therefore, there is a need to debug invalid memory references as they occur, and with sufficient granularity.

BRIEF SUMMARY OF THE INVENTION

A method, system, and computer program product for identifying invalid memory references in a debugging application. In one embodiment, invalid memory references are identified as they occur. In another embodiment, the invalid memory references are identified within a customized operating system that runs within an application.

A portion of a shared memory can be allocated to a first process. A shadow memory, which can be commensurate in size with the shared memory, stores states associated with states within the shared memory. Accesses to the shared memory, such as instruction pointers, can be intercepted to determine whether an invalid memory reference has just occurred, or will occur, due to the instruction pointer under examination.

In one embodiment, the state includes a counter maintaining a number of accesses to a memory address using, for example, two bits. As such, the counter rotates through the range of 0 to 3. If a rogue process accesses the memory address between the successive accesses by a process that should have exclusive use, the counter will reveal an intermittent access. Thus, a count of a successive access compared to a count of a current access should only have a single increment, unless an error has occurred. The error can be caused by memory overruns, memory underruns, stale pointers, and the like.

In still another embodiment, the count used for comparison to a count in the shadow memory, is inserted as a header to an instruction pointer.

In an implementation, a system includes: a memory allocator to allocate a portion of a shared memory to a first process; a shadow memory to store tracking information responsive to accesses by a process to the shared memory; and a debug analyzer to identify in real-time, from the tracking information, an invalid memory reference in the shared memory caused by an illegal access by a process other than the first process, wherein real-time identification occurs on a per-instruction basis after execution of a first instruction and prior to execution of a second instruction.

In various implementations, the shadow memory increments a counter responsive to each access by a process to an address in the shared memory. The debug analyzer identifies an intermittent increment in the counter between successive accesses to the address by the first process, the increment caused by an access to the shared memory portion by a second process.

The system may further include an interceptor to, prior to storing tracking information, intercepting the accesses to shared memory. The first process accesses an address within the shared memory with an instruction pointer, the instruction pointer including tracking information stored used to identify the illegal access. The shadow memory releases, from the first process at least a single address from the shared memory portion, reallocates the at least the single address to a third process, wherein the debug analyzer subsequently identifies an illegal access to single address by the first process.

The illegal access is caused by one selected from the group consisting of a memory overrun, a memory underrun, and a stale pointer. The debug analyzer terminates the first process responsive to identifying the invalid memory reference. The debug analyzer outputs a notification regarding the invalid memory reference prior to executing another instruction.

The system may further include a first operating system to allocate a portion of physical memory to a second operating system, the second operating system being application-specific and allocating the shared memory portion to the first process. A size of the shared memory equals a size of the shadow memory.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
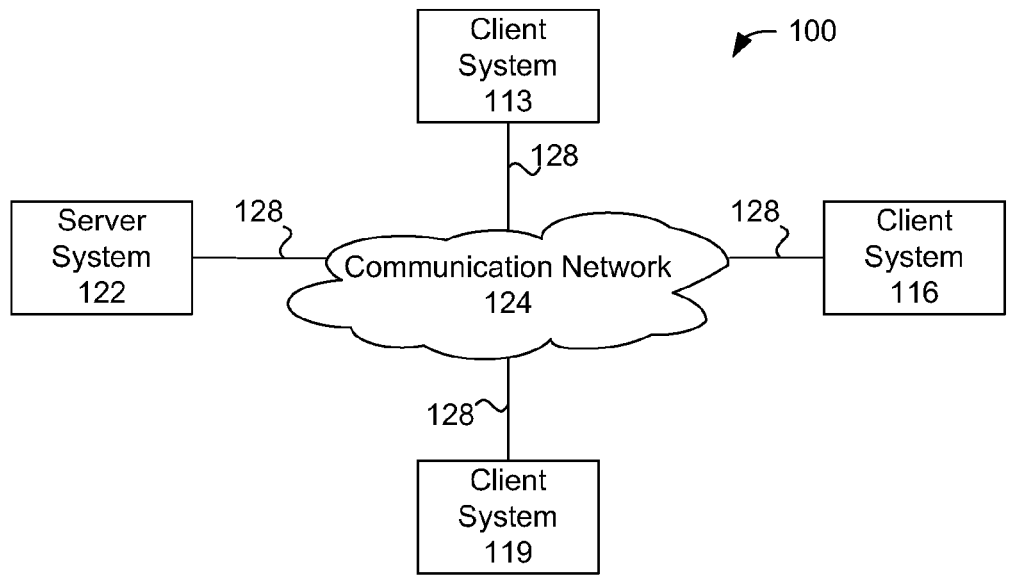
FIG. 1 shows a block diagram of a client-server system and network, according to one embodiment of the present invention.

FIG. 1 is a simplified block diagram of a distributed computer network 100 which may include an implementation of the present invention. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
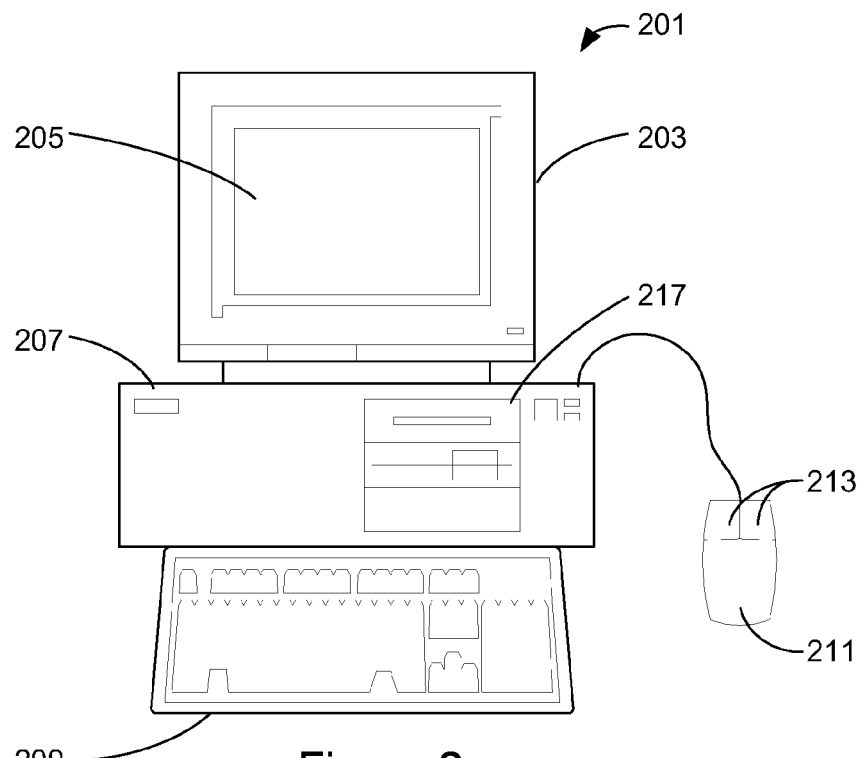
FIG. 2 shows a more detailed diagram of an exemplary client or computer, according to one embodiment of the present invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
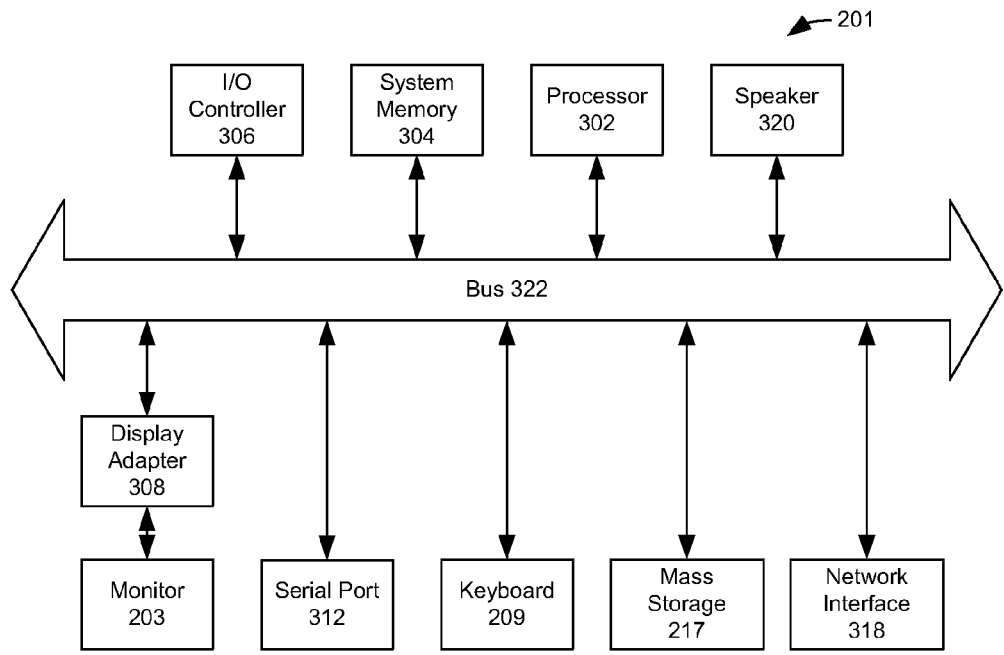
FIG. 3 shows a system block diagram of a client computer system used to provide a user interface, according to one embodiment of the present invention.

FIG. 3 shows a system block diagram of computer system 201 which may be used to execute software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, Ubuntu Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
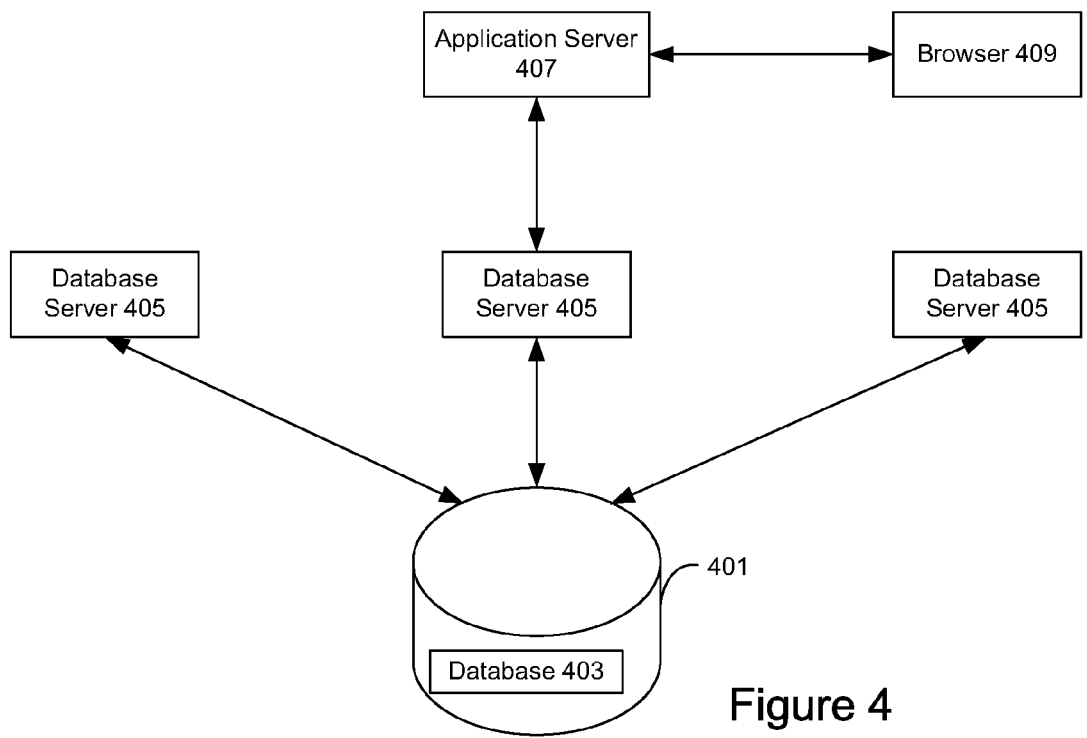
FIG. 4 shows data source or data service in the form of a database system, according to one embodiment of the present invention.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
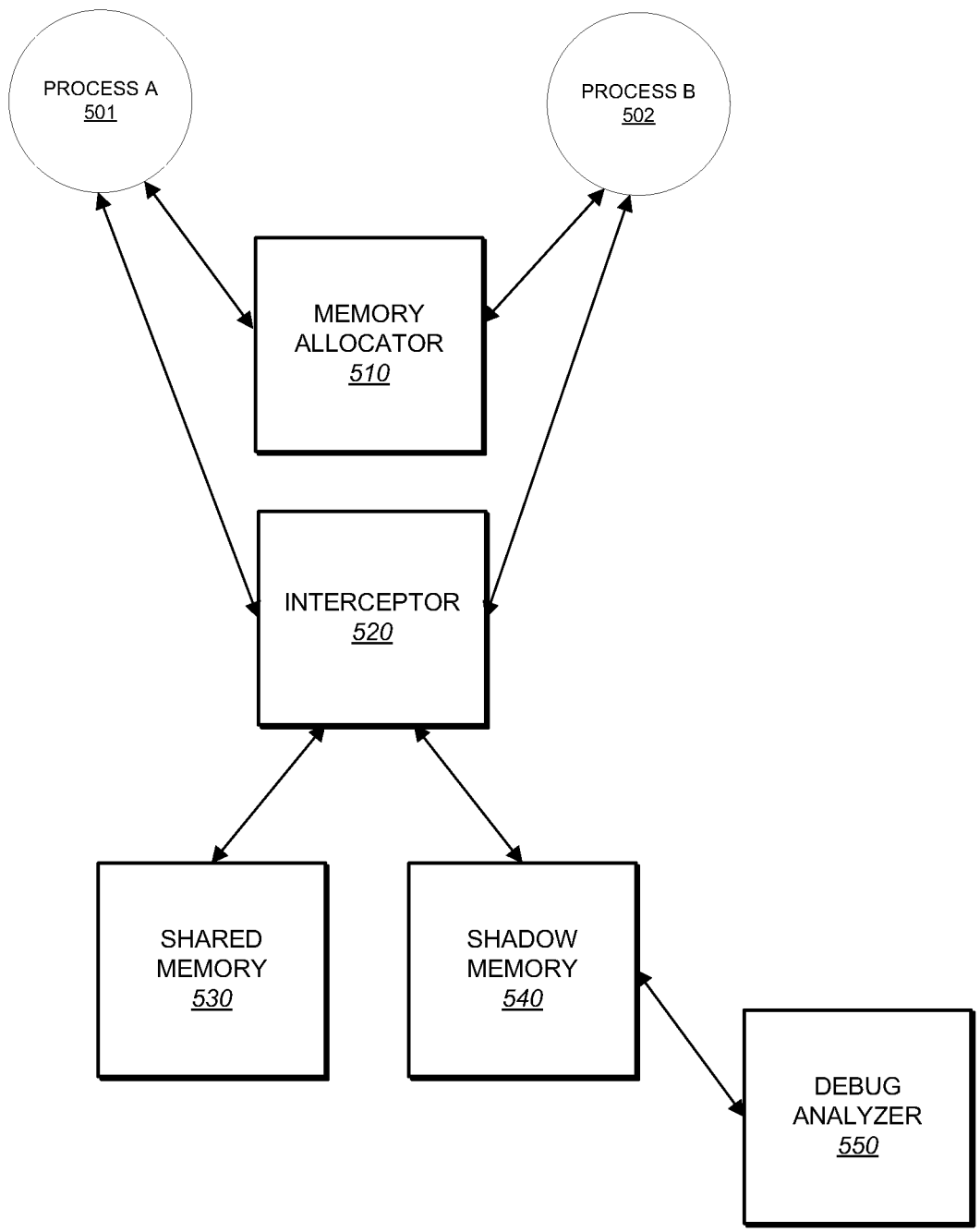
FIG. 5 is a block diagram illustrating one embodiment of a system to detect invalid memory references, according to one embodiment of the present invention.

FIG. 5 is a block diagram illustrating one embodiment of a system 500 to detect invalid memory references. The system 500 can be implemented in the computer system 301 of FIG. 3. The system 500 includes a memory allocator 510, an interceptor 520, and a debug analyzer 550 in communication with a shared memory 530 and a shadow memory 540. One of ordinary skill in the art will recognize that various embodiments of the system 500, such as embodiments having similar functionalities under alternative configurations, are within the spirit of the present invention. In one embodiment, the system 500 can be a proactive debugger to assist identification of errors in real-time during execution. Real-time can refer to instant identification, or identification prior to execution of a next transaction. The system 500 can be based on the PIN dynamic binary instrumentation framework, a trace analyzer, or any other tool allowing observation of an executing application. Methods operating within the system 500 are described in more detail below with respect to FIGS. 7 and 8. U.S. patent application Ser. No. 11/726,060 (published as U.S. patent application publication 2008/0235481, Sep. 25, 2008) provides some description of a shared memory and is incorporated by reference along with all other references cited in this application. U.S. patent application Ser. No. 10/746,471 (published as U.S. patent application publication 2005/0114621, May 26, 2005); U.S. Pat. No. 7,499,960, issued Mar. 3, 2009; and U.S. Pat. No. 7,409,517, issued Aug. 5, 2008, are also incorporated by reference.

Process A 501 and process B 502 can be instances or threads of software applications that are executed by, for example, processor 302 of FIG. 3. The processes A and B 501, 502 can be spawned from independent applications, or part of an integrated software package such as a database application. For example, each SQL statement in a database spawn a process. Process A 501 can be allocated a section of the shared memory 540 to store instructions or data. At a subsequent point in time, process B 502 can be allocated a section of the shared memory 530, that at least partially overlaps the section previously allocated to process A 501, if the memory allocator 510 determines that process A 501 no longer requires access to that portion. In other words, a part of the shared memory 530 (e.g., at least one memory address or kernel address) is reallocated to a different process. In another embodiment, the processes 501, 502 do not have overlapping memory spaces, although associated kernel addresses can be adjacent or relatively nearby in some embodiments.

The memory allocator 510 receives a request for a shared pool of memory space from the processes A and B 501, 502. Once available memory space is assigned (or pinned), the memory allocator 510 manages future requests to ensure that a single process has access to the assigned space until it is deallocated. Various algorithms can be used for deallocation, such as the least recently used, or the least frequently used. The terminated or revoked memory space is returned for reassignment to a subsequent process. In one embodiment, the memory allocator 510 is part of the shared memory 530 (e.g., as a heap manager (KGH)).

The interceptor 520 receives transaction request from the processes A and B 501, 502 to the shared memory 530. The interceptor 520 reads the memory space address of the transaction, and sends a notification to the shadow memory 540 including the memory space address. The original transaction is also forwarded on to the shared memory 530. In one embodiment, the functionality of the debugging analyzer 550 described below is performed at the interceptor 520, prior to forwarding to the shadow memory 540.

The shared memory 530 can be a chunk of physical memory (e.g., random access memory or flash memory) that is allocated from an operating system and shared among processes (e.g., an SGA or shared global area). A size of the memory chunk can be fixed or variable. The shared memory 530 can be used for a library cache, a dictionary cache, a control structure, and the like. The library cache is a portion of memory storing an execution plan or objects (e.g., packages, procedures, functions, shared cursors, etc.). The control structure is a portion of memory storing information regarding internal latch and locks, bugger headers, and the like. The shared memory 530 receives the transaction requests from the processes A and B 501, 502, and, in response, reads, writes, copies, or moves data.

The shadow memory 540 can be generated or created by the debug analyzer 550 to provide metadata about the shared memory 530. In one embodiment, the shared and shadow memories 530, 540 have the same size of address space (e.g., 256 MB). The shared and shadow memory 540 can be on the same or separate memory devices. The shadow memory 540 receives the notification from the interceptor 520, and, in response, stores tracking information. For example, a counter can be incremented to track the number of accesses by the processes A and B 501, 502. In another example, an identification of which process is accessing the memory can be tracked.

The debug analyzer 550 uses the tracking information to identify invalid memory references. For example, the debug analyzer 500 can identify memory overruns, memory underruns, and stale pointer references. In one embodiment, the debug analyzer 550 compares a count associated with a process to a subsequent count associated with the same process. If there has been an intermittent increment of the count, then a rogue process may have compromised the memory space. A rogue process can be a process that was previously assigned the same memory address, or a process that operating outside of allocated memory addresses.

Optionally, the debug analyzer 550 can terminate a process (i.e., the rogue process or the compromised process) or log the error.

Figure 6:
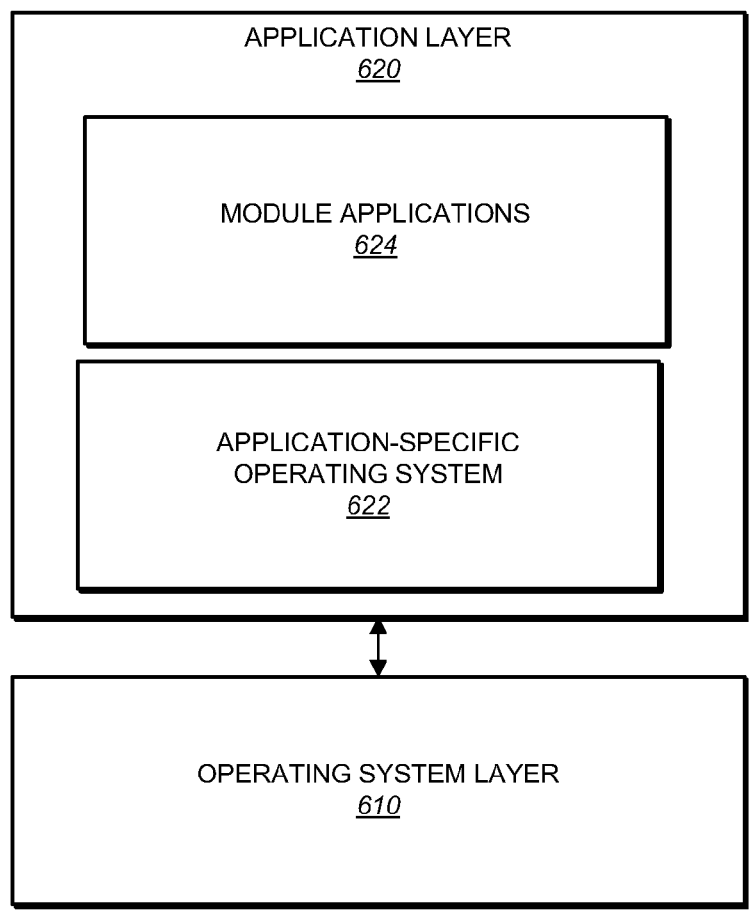
FIG. 6 is a block diagram illustrating a software architecture according to one embodiment of the present invention, according to one embodiment of the present invention.

FIG. 6 is a block diagram illustrating a software architecture 600 according to one embodiment of the present invention. The software architecture 600 includes an operating system (OS) layer 610 and an application layer 620. Within the application layer 620 is an application-specific OS 622 layer and a module applications layer 624.

The OS layer 610 can be, for example, Microsoft Windows operating system, Linux, or any other interface between software applications and computer hardware. The OS layer 610 maps kernel addresses to locations in physical memory. The OS layer 610 can allocate a portion of physical memory to applications in the application layer 620. Transaction requests received from the applications layer 620, by the OS layer 610, include commands such as read, write, copy, move, and the like. One or several applications can request memory allocations.

The application layer 620 can be, for example, a database application, a word processing application, or any other software application. The module applications 624 can be integrated into an environment of the application layer 620, and run as processes within the application-specific OS 622. As such, the application-specific OS 622 manages reallocation of the portion of memory allocation secured from the OS layer 610. For example, processes A an B 501, 502 of FIG. 5 can request memory space as described above in association with FIG. 5.

Figure 7:
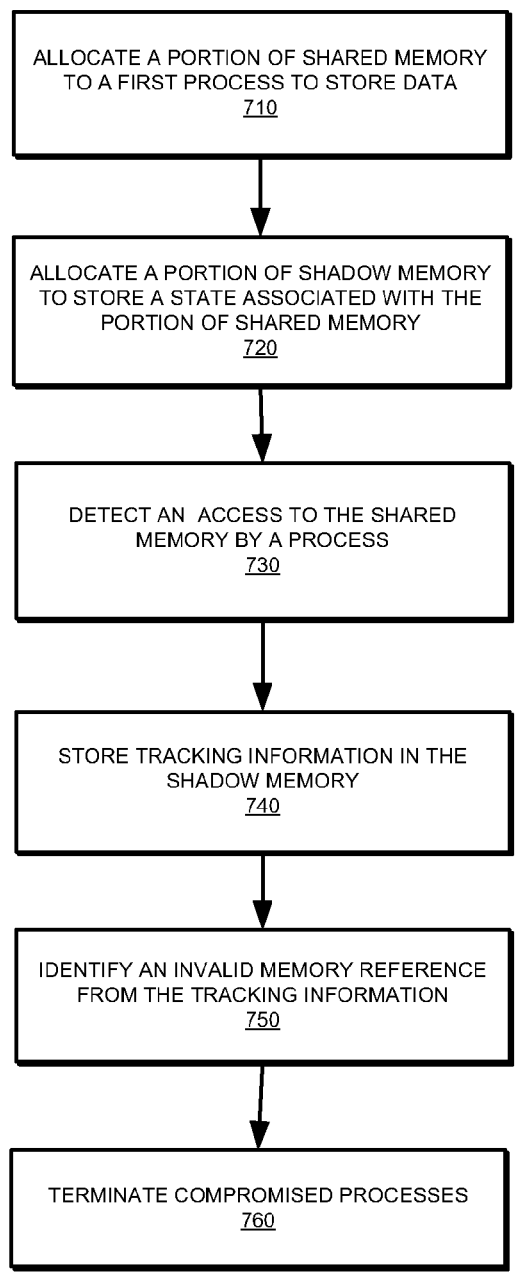
FIG. 7 is a flow chart illustrating a method for detecting invalid references to a shared memory, according to one embodiment of the present invention.

FIG. 7 is a flow chart illustrating a method 700 for detecting invalid references to a shared memory. The method 700 can be implemented in, for example, the memory allocation system 500 of FIG. 5.

A portion of shared memory is allocated to a process 710. The process requests transactions with the assigned memory space under the assumption of exclusivity. Once a process ends by termination or otherwise, the address space is returned to a pool of available addresses that can be assigned to a subsequent process. Consequentially, a rogue process that writes to one of the exclusive memory addresses can cause errors in the process execution.

A portion of shadow memory is allocated to store a state associated with the portion of shared memory 720. The portion of shadow memory can be commensurate in size with the portion of shared memory so that the same memory offsets can be used for each. In a preferred embodiment, processes are unaware of the shared memory.

An instruction access to the shared memory is detected 730. In one embodiment, the instruction access is intercepted prior to reaching the shared memory. The instruction access can be injected with code to call an instruction pointer (e.g., PUSH instruction pointer; and CALL printip( ).

Tracking information is stored in the shadow memory 740. In one embodiment, the tracking information includes a counter to track each access to the shadow memory, as described in more detail below with respect to FIG. 8. In another embodiment, an identification of a last process to access a memory address can be stored in the shadow memory. Other tracking techniques can be substituted within the spirit of the present invention.

An invalid memory reference is identified from the tracking information 750. In one embodiment, the tracking information is analyzed by a debug analyzer (e.g., debug analyzer 550) to determine whether illegal accesses have occurred that potentially compromised the data of the memory reference.

Optionally, a process is aborted 760. The process that has been compromised, or the suspected rogue process can be terminated or limited once an error is discovered, to prevent additional errors. In addition, a message can be output to a user interface to alert a software developer of the error status in real-time, prior to executing of a following instruction. The software developer can then triage the issue rather than attempting to reproduce the error at a later time. In other embodiments, a log is maintained for analysis at a later time.

Figure 8:
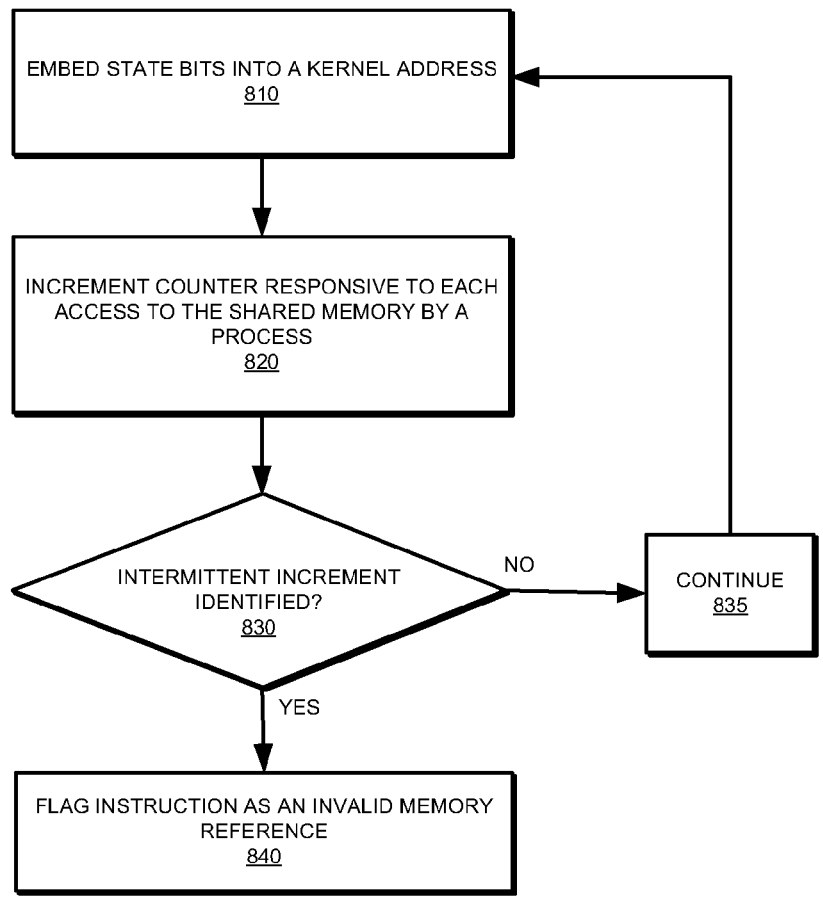
FIG. 8 is a flow chart illustrating a method of using a counter to identify an invalid memory reference, according to one embodiment of the present invention.

FIG. 8 is a flow chart illustrating a method 800 of using a counter to identify an invalid memory reference. Counters are one example of tracking information stored in the shadow memory 540 of FIG. 5.

Figure 9:
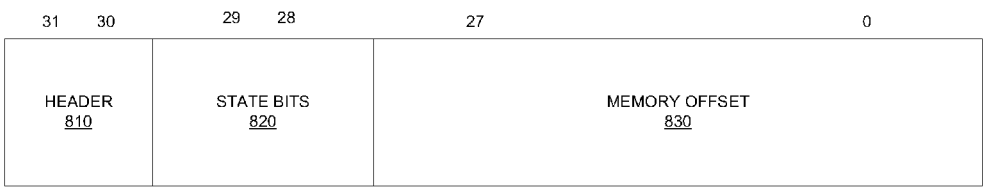
FIG. 9 is a schematic diagram illustrating an instruction pointer packet, according to one embodiment of the present invention.

State bits are embedded into a kernel address 810 as illustrated in example FIG. 9. Turning to FIG. 9, a packet 900 provides a kernel address of an instruction pointer to a shared memory. The 32-bit kernel address can include the range [0xc0000000, 0xffffffff] for a memory space sized at 256 MB. A header spans bits 30 and 31, state bits span bits 28 and 29, while the memory offset spans bits 0 to 27. The two state bits 820 yield four states. In other embodiments, the number of state bits can be varied. With more bits, the accuracy of error detection increases.

Returning to the method 800 of FIG. 8, a rotating counter is incremented responsive to each access to the shared memory 820. The counter represents the state by tracking a number of accesses. Based on a two-bit counter, the states take on values ranging from 0 to 3. If a single process is accessing a memory address, then the count increases in single increments.

If an intermittent increment is identified 830, the associated instruction is flagged as an invalid memory reference 840. A rogue process that access a memory address will also cause the counter to increment. Once the valid process returns to the same memory address, the count will reveal the intermittent access. In other words, rather than a single increment, the count will have increases by two or three increments.

The following is an example of code used to collect instruction pointers:

```
int main(int argc, char * argv[ ])
{
    //initialize pin
    PIN_Init(argc, argv);
    //Register Instruction to be called to instrument instructions
    INS_AddInstrumentFunction (Instruction, 0);
    //Register Fini to be called when the application exits
    PIN_AddFiniFunction (Fini, 0);
    //Start the program, never returns
    PIN_StartProgram( );
    Return 0;
}
FILE *trace;
//This function is called before every instruction is executed and
prints the IP
VOID printip(VOID *ip){fprintf(trace, "%p/n", ip);}
{pin calls this function every time a new instruction is encountered
VOID Instruction (INS ins, VOID *v)
{
//Insert a call to printip before every instruction, and pass the IP
INS_InsertCall (ins, IPOIN_BEFORE, (AFUNPTR) printip,
IARG_INST_PTR,
IARG_END);
}
//This function is called when the application exits
VOID Fini(INT32 code, VOID *v)
{
    fprintf(trace, "#eof\n");
    fclose(trace);
}
```

Figure 10:
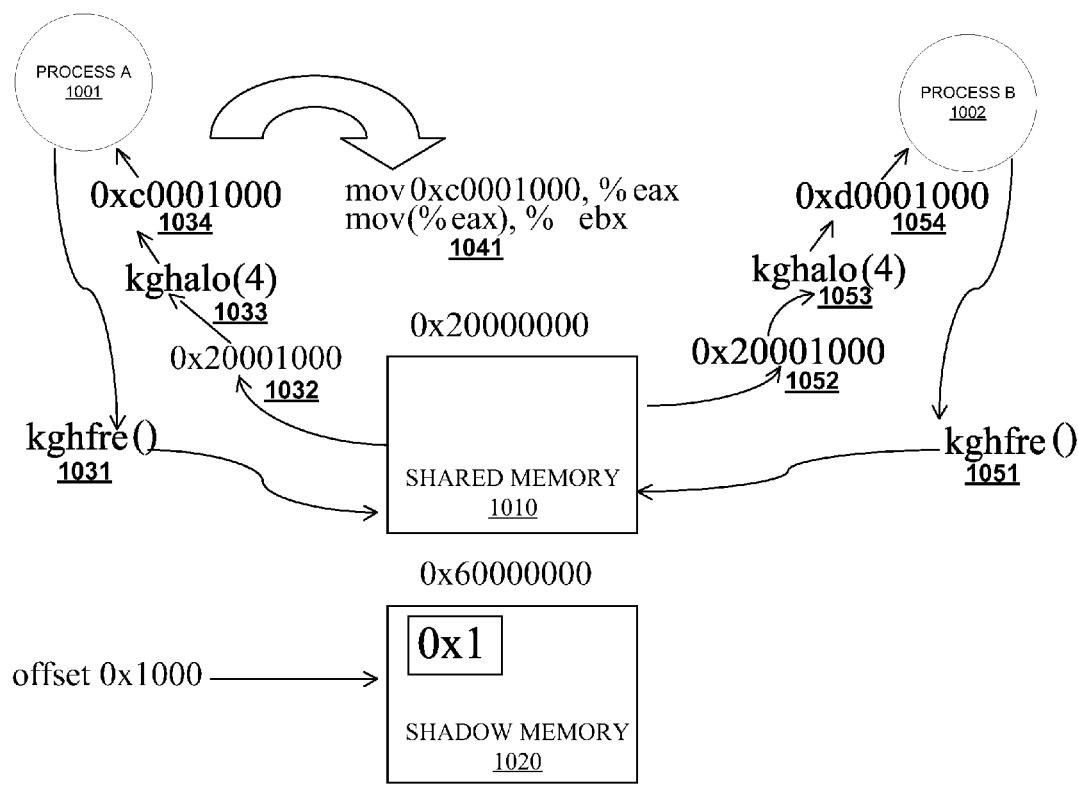
FIG. 10 is a flow diagram illustrating an example of identifying an invalid memory reference, according to one embodiment of the present invention.

FIG. 10 is a flow diagram illustrating an example of identifying an invalid memory reference. It will be understood by one of ordinary skill in the art that the example merely illustrates the invention without limiting its scope.

In the example, process A 1001 requests a memory allocation using a memory heap routine kghfre( ) 1031. A memory allocator assigns a portion of a shared memory 1010 at kernel offset 0x20001000 1032. A memory allocation routine kghalo(4) 1033 adds a 4-bit header, including two state bits, to the address allocation for tracking access to the memory location, resulting in kernel offset 0xc0001000 1034. The state bits can be stored in a shadow memory 1020.

Once process A 1001 receives the memory allocation, an associated instruction can be executed. In this example, a move instruction 1041 directs a chunk of data to be copied to a new location and deleted from an original location.

Similarly, process B 1002 requests a memory allocation using heap routing kghfre( ) 1051. The memory allocator assigns the same portion of the shared memory 1010 at kernel offset 0x20001000, causing an increment in a rotating counter. Consequentially, when a memory allocation routine kghalo(4) 1053 adds a 4-bit header based on the state bits, the resulting kernel offset is 0xd001000.

When a subsequent instruction is executed by process A 1001 using the same memory space, a debug analyzer will recognize an intervening increment in the state bits of the kernel address. In response, the debug analyzer can pinpoint an invalid memory reference in real-time, i.e., between execution of the mov instruction and the subsequent instruction.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method comprising:
    allocating a portion of a shared memory, to a first process;
    storing a first counter responsive to successive accesses by any process to the portion of the shared memory; and
    detecting, subsequent to the first process and a second process other than the first process each accessing the portion of the shared memory, occurrence of an invalid memory reference to the portion of the shared memory caused by an access by the second process, based on at least one of:
    comparison of the first counter with a second counter responsive to successive accesses by the first process to the portion of the shared memory; or
    comparison of the first counter with a third counter responsive to successive accesses by the second process to the portion of the shared memory.

2. The method of claim 1 wherein:
    an intermittent increment in the first counter between successive accesses made by the first process is caused at least by the access by the second process.

3. The method of claim 1 further comprising:
    intercepting the accesses to the portion of the shared memory, to determine whether the invalid memory reference will occur.

4. The method of claim 1 further comprising:
    releasing, from the first process, at least one address from the portion of the shared memory;
    reallocating said at least one address; and
    detecting occurrence of an illegal access to said at least one address by the first process.

5. The method of claim 1 wherein:
    the access by the second process is caused by an event selected from the group consisting of: a memory overrun, a memory underrun, and a stale pointer.

6. The method of claim 1 further comprising:
    terminating the second process responsive to detection of occurrence of the invalid memory reference.

7. The method of claim 1 further comprising:
outputting a notification regarding the invalid memory reference in executing a current instruction, prior to executing another instruction.

8. The method of claim 1 wherein said portion is hereinafter a first portion, the method further comprising:
allocating a second portion of physical memory by a first operating system to a second operating system; and
spawning processes within the second operating system, the second operating system being comprised in a database application;
wherein the first portion is allocated to the first process by the second operating system.

9. A non-transitory computer readable storage medium containing program instructions, which when executed by one or more processors, cause the one or more processors to perform a method, the program instructions comprising:
instructions to allocate a portion of a shared memory, to a first process;
instructions to store a first counter responsive to successive accesses by any process to the portion of the shared memory; and
instructions to detect, subsequent to the first process and a second process other than the first process each accessing the portion of the shared memory, occurrence of an invalid memory reference to the first portion of the shared memory caused by an access by the second process, based on at least one of:
comparison of the first counter with a second counter responsive to successive accesses by the first process to the portion of the shared memory; or
comparison of the first counter with a third counter responsive to successive accesses by the second process to the portion of the shared memory.

10. The non-transitory computer readable storage medium of claim 9 wherein:
an intermittent increment in the first counter between successive accesses made by the first process is caused at least by the access by the second process.

11. The non-transitory computer readable storage medium of claim 9 wherein the program instructions further comprise:
instructions to intercept the accesses to the shared memory, to determine whether the invalid memory reference will occur.

12. The non-transitory computer readable storage medium of claim 9 wherein the program instructions further comprise:
instructions to be executed by the first process to release at least one address from the portion of the shared memory;
instructions to reallocate said at least one address; and
instructions to detect occurrence of an illegal access to said at least one address by the first process.

13. The non-transitory computer readable storage medium of claim 9 wherein:
the access by the second process is caused by an event selected from a group consisting of: a memory overrun, a memory underrun, and a stale pointer.

14. The non-transitory computer readable storage medium of claim 9 wherein the program instructions further comprise:
instructions to terminate the second process responsive to detection of occurrence of the invalid memory reference.

15. The non-transitory computer readable storage medium of claim 9 wherein the program instructions further comprise:
instructions to output a notification regarding the invalid memory reference in executing a current instruction, prior to executing another instruction.

16. The non-transitory computer readable storage medium of claim 9 wherein said portion is hereinafter a first portion, the program instructions further comprising:
instructions to allocate a portion of physical memory by a first operating system to a second operating system; and
instructions to spawn processes within the second operating system, the second operating system being comprised in a database application;
wherein the first portion is allocated to the first process by the second operating system.

17. The method of claim 1 wherein:
the first counter is comprised in a shadow memory; and
the second counter is comprised in multiple bits within an instruction pointer used by each process to access the portion of the shared memory.

18. The non-transitory computer readable storage medium of claim 9 wherein:
the first counter is comprised in a shadow memory; and
the second counter is comprised in multiple bits within an instruction pointer used by each process to access the portion of the shared memory.

19. A computer-implemented method comprising:
allocating a portion of a shared memory, to a first process;
storing a first counter responsive to successive accesses by any process to the portion of the shared memory; and
detecting, subsequent to the first process and a second process other than the first process each accessing the portion of the shared memory, occurrence of an invalid memory reference to the portion of the shared memory caused by an access by the second process, based on at least comparison of the first counter with a second counter responsive to successive accesses by the first process to the portion of the shared memory.

20. The method of claim 19 further comprising:
intercepting the accesses to the portion of the shared memory, to determine whether the invalid memory reference will occur.

21. The method of claim 19 further comprising:
releasing, from the first process, at least one address from the portion of the shared memory;
reallocating said at least one address to a third process; and
detecting occurrence of an illegal access to said at least one address by the first process.

22. The method of claim 19 wherein said portion is hereinafter a first portion, the method further comprising:
allocating a second portion of physical memory by a first operating system to a second operating system; and
spawning processes within a second operating system, the second operating system being comprised in a database application;
wherein the first portion is allocated to the first process by the second operating system.

23. The method of claim 19 wherein:
the first counter is comprised in a shadow memory; and
the second counter is comprised in multiple bits within an instruction pointer used by each process to access the portion of the shared memory.

24. A non-transitory computer readable storage medium comprising program instructions, which when executed by one or more processors, cause the one or more processors to perform a method, the program instructions comprising:
instructions to allocate a portion of a shared memory, to a first process;
instructions to store a first counter responsive to successive accesses by any process to the portion of the shared memory; and instructions to detect, subsequent to the first process and a second process other than the first process each accessing the portion of the shared memory, at least one occurrence of an invalid memory reference to the portion of the shared memory caused by an access by the second process, based on at least comparison of the first counter with a second counter responsive to successive accesses by the first process to the portion of the shared memory.

25. The non-transitory computer readable storage medium of claim 24 wherein the program instructions further comprise:
   instructions to be executed by the first process to release at least one address from the portion of the shared memory;
   instructions to reallocate said at least one address; and
   instructions to detect occurrence of an illegal access to said at least one address by the first process.

26. The non-transitory computer readable storage medium of claim 24 wherein said portion is hereinafter a first portion, the program instructions further comprising:
   instructions to allocate a second portion of physical memory by a first operating system to a second operating system; and
   instructions to spawn processes within a second operating system, the second operating system being comprised in a database application;
   wherein the first portion is to be allocated to the first process by the second operating system.

27. The non-transitory computer readable storage medium of claim 24 wherein:
   the first counter is comprised in a shadow memory; and
   the second counter is comprised in multiple bits within an instruction pointer used by each process to access the portion of the shared memory.

28. The non-transitory computer readable storage medium of claim 24 wherein the program instructions further comprise:
   instructions to intercept the accesses to the portion of the shared memory, to determine whether the invalid memory reference will occur.

29. A computer system comprising:
   one or more processors;
   one or more memories comprising program instructions to be executed by the one or more processors to perform a method;
   wherein the program instructions comprise:
   instructions to allocate a portion of a shared memory, to a first process;
   instructions to store a first counter responsive to successive accesses by any process to the portion of the shared memory; and
   instructions to detect, subsequent to the first process and a second process other than the first process each accessing the portion of the shared memory, at least one occurrence of an invalid memory reference to the portion of the shared memory caused by an access by the second process, based on at least one of:
   comparison of the first counter with a second counter responsive to successive accesses by the first process to the portion of the shared memory; or
   comparison of the first counter with a third counter responsive to successive accesses by the second process to the portion of the shared memory.

30. A computer system comprising:
   one or more processors;
   one or more memories comprising program instructions to be executed by the one or more processors to perform a method;
   wherein the program instructions comprise:
   instructions to allocate a portion of a shared memory, to a first process;
   instructions to store a first counter responsive to successive accesses by any process to the portion of the shared memory; and
   instructions to detect, subsequent to the first process and a second process other than the first process each accessing the portion of the shared memory, occurrence of an invalid memory reference to the portion of the shared memory caused by an access by the second process, based on at least comparison of the first counter with a second counter responsive to successive accesses by the first process to the portion of the shared memory.

* * * * *

UNITED STATES PATENT AND TRADEMARK OFFICE
CERTIFICATE OF CORRECTION

PATENT NO. : 8,516,450 B2
APPLICATION NO. : 12/727803
DATED : August 20, 2013
INVENTOR(S) : Narasimhan It is certified that error appears in the above-identified patent and that said Letters Patent is hereby corrected as shown below:

On title page 2, column 1, item [56] under other publications, line 5, delete "Wroker" and insert -- Worker --, therefor.

In the Specification

Column 8, line 14, delete "A an B" and insert -- A and B --, therefor.

Column 8, line 39, delete "printip( )." and insert -- printip( )). --, therefor.

Signed and Sealed this
Twenty-sixth Day of November, 2013

Margaret A. Focarino
*Commissioner for Patents of the United States Patent and Trademark Office*